July 30, 1929.  D. T. GARRETT  1,722,463
PLANTER ATTACHMENT
Filed Feb. 24, 1927
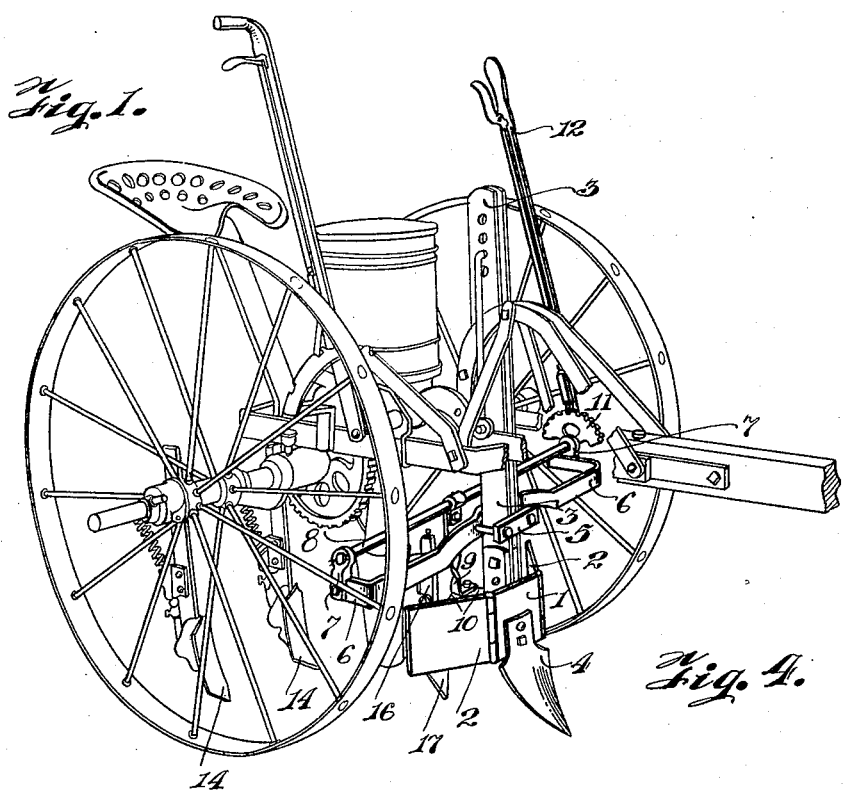
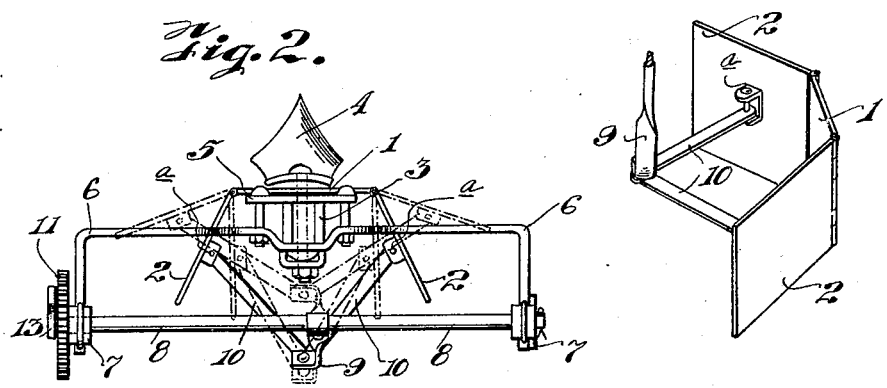
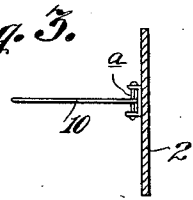
Daniel T. Garrett
INVENTOR.
BY *Ernest A. Wood*
ATTORNEY.

Patented July 30, 1929.

1,722,463

UNITED STATES PATENT OFFICE.

DANIEL TAY GARRETT, OF WACO, TEXAS.

PLANTER ATTACHMENT.

Application filed February 24, 1927. Serial No. 170,472.

This invention relates to improvements in agricultural implements and it refers more particularly to an attachment for grain and seed planters and drills, and it has for its principal object the provision of a device, attachable rearwardly of the front sweep, adjustable at will by the operator from his seat, to instantaneously govern the quantity of soil controlled by the covering shares, thereby to insure even depth of planting irrespective of the nature of the soil and sudden changes encountered therein.

Another object of the invention resides in the provision of a planter attachment of the character designated which is capable of leveling the beds in accordance with the condition of the soil, that is, to suit the requirements thereof during wet or dry seasons, hence causing the seed thus planted to germinate and come up to stand from one to three days earlier, and in addition to this, the aforesaid leveling of the soil to obtain more uniform depth, results in equal germination of the seed and consequent simultaneous development.

The invention further aims among its objects to provide a device of the character designated, of a simple construction capable of being installed upon a great variety of planters and drills by unskilled operators. Moreover, its operation is reduced to such simplicity as to require no added effort to control.

With these foremost objects and advantages in view, the invention has particular reference to certain novel features of construction and arrangement of parts by which said objects are attained and which will be fully and comprehensively described in the following description and illustrated in the annexed drawings, wherein:

Figure 1 represents a perspective view of a planter upon which the invention is attached.

Figure 2 is a diagrammatic plan view of the invention showing its various angles of adjustment.

Figure 3 is a detail view of one of the adjustable wings of the invention, and

Figure 4 is a perspective view of the wings.

Continuing now more in detail with the drawings, it may be first stated that heretofore in planting corn and cotton especially, depth of planting depended upon the penetrating depth of the opening shovel, which in most cases was adjusted to position by hand with respect to the shank. Others are provided with a lever adjustment of the shovel operable from the operator's seat, but this has proven unsatisfactory especially in working a farm composed of a combination black and sandy land.

Other than being attached to the supporting shank of the sweep the invention has no effect upon the latter's operation, its sole function being to control the soil otherwise accessible to the covering shovels following immediately behind and straddling the furrow of the opening shovel.

Now, the invention consists in an intermediate plate 1 to either side of which is hingedly connected wings 2, the intermediate plate being made rigid by its solid engagement with the shank 3 of the sweep 4. Directly above the member 1 and also bolted to the shank 3 by a plate 5 is a lateral support 6, whose outer ends are turned abruptly rearward with respect to the planter and to which are bolted bearings 7, the latter supporting the ends of a lateral shaft 8, see Figure 2. At a central position on this shaft is clamped a link 9, depending downwardly and is pivoted jointly to the ends of a pair of arms 10, the other ends of these arms being pivotally attached at $a$ to the inner faces of the wings 2, as in Figures 2 and 3.

A quadrant 11 is mounted integral with one of the bearings 7 and controls the positions of an operating lever 12, which is attached to a link 13, as in Figure 2, rigidly secured to the ends of the shaft 8, and by which the latter is rotated.

In operation, the invention being properly mounted as described, the sweep 4 is set according to the depth desired in which position it remains. Assuming that sand is encountered and it is desired to set the seed at a greater depth, this is accomplished by simply moving the lever 12 to cause the wings 2 to move inwardly, consequently permitting the covering shovels 14 to have access to the soil turned by the sweep 4, thereby covering them to a greater depth. On the other hand, a shallow depth may be desirable, and in this event, a similar operation is carried out to cause the wings 2 to be moved outwardly as indicated in Figure 2, so that the soil turned by the sweep 4 will be forced still further outward by the wings, or out of range of the covering shovels 14. Consequently, the result will be that the minimum soil turned by the covering shovels will be that left by the wings 2, sufficient only to cover the seed at a shallow depth.

Manifestly, the construction shown is capable of considerable variation, and such variation as is in keeping with the appended claims is also considered within the spirit of the invention.

What is claimed is:

1. An attachment for planters and the like including in combination with a vertical shank, a central lateral plate secured to the lower end of said shank, an opening shovel secured to the front face of said plate and located between the ends of the plate, side wings hinged to the ends of the plate, a horizontal shaft, a substantially U-shaped supporting member at the rear of the shank, means engaging the front of the shank to detachably clamp said member at its center to the rear of the shank, means to rotatably connect the ends of the shaft to the free ends of said U-shaped member, an arm rigidly secured to the center of the shaft and depending therefrom, means to rotate and adjustably hold the shaft, and horizontal links pivoted at their outer ends to the wings and at their inner ends to the lower end of the arm.

2. In combination with a vertical shank, a central lateral plate secured to the lower end of said shank, an opening shovel secured to said plate, side wings hinged to the ends of the plate, a horizontal supporting member, means engaging the front of the shank to clamp said member to the rear of the shank, a shaft rotatably carried by the member, links pivoted at their outer ends to the wings and means carried by the shaft and to which the inner ends of the links are pivoted so as to move the wings upon rotation of the shaft.

In testimony whereof I affix my signature.

DANIEL TAY GARRETT.